(12) United States Patent
Berrettini et al.

(10) Patent No.: US 8,542,422 B2
(45) Date of Patent: Sep. 24, 2013

(54) OPTICAL FLIP-FLOP

(75) Inventors: Gianluca Berrettini, Pisa (IT); Antonio Malacarne, Leghorn (IT); Luca Poti, Pisa (IT); Antonella Bogoni, Mantova (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 332 days.

(21) Appl. No.: 12/989,598

(22) PCT Filed: Apr. 25, 2008

(86) PCT No.: PCT/EP2008/055115
§ 371 (c)(1),
(2), (4) Date: Jan. 10, 2011

(87) PCT Pub. No.: WO2009/129866
PCT Pub. Date: Oct. 29, 2009

(65) Prior Publication Data
US 2011/0122470 A1 May 26, 2011

(51) Int. Cl.
*G06E 3/00* (2006.01)
(52) U.S. Cl.
USPC .......................................... 359/107
(58) Field of Classification Search
USPC ............ 359/107–108; 398/45, 47–49, 51–54
See application file for complete search history.

(56) References Cited

FOREIGN PATENT DOCUMENTS
EP   1 176 459   1/2002

OTHER PUBLICATIONS

Malacarne et al. (All-Optical Flip-Flop, The 5th International Conference on Optical Internet [COIN 2006], pp. 163-164).*
International Search Report for PCT/EP2008/055115, mailed Jan. 29, 2009.
Jing et al., "Three-State Optical Memory Based on Coupled Ring Leaders", Optical Fiber Communication/National Fiber Optic Engineers Conference, 2008. OFC/NFOEC 2008, Piscataway NJ, USA, Feb. 24, 2008, pp. 1-3, XP031257010.

(Continued)

*Primary Examiner* — Stephone Allen
*Assistant Examiner* — Kimberly N Kakalec
(74) *Attorney, Agent, or Firm* — Nixon & Vanderhye P.C.

(57) ABSTRACT

An optical flip-flop comprises first (102) and second (104) flip-flop elements arranged to respectively provide first (output 1) and second (output 3) optical outputs. Each output is in one of a plurality of states, wherein switching the output from a relatively high power state to a relatively low power state has an associated falling edge transition time, and switching the output from a relatively low power state to a relatively high power state has an associated rising edge transition time. The rising edge transition time is greater than the falling edge transition time. The optical flip-flop also comprises a processor (106) arranged to process the first and second outputs to provide an optical flip-flop output, being one of a plurality of state outputs, wherein switching the flip-flop output from a relatively high power state to a relatively low power state has an associated falling edge transition time, and switching the flip-flop output from a relatively low power state to a relatively high power state has an associated rising edge transition time. The processor is arranged to process the first and second outputs such that both the falling edge transition time and the rising edge transition time of the flip-flop output are independent of the rising edge transition times of both the first and second flip-flop elements. The invention also provides a method of operating the flip-flop, an optical switching arrangement and an optical switching method.

20 Claims, 11 Drawing Sheets

(56) References Cited

OTHER PUBLICATIONS

Lowry et al., "Picosecond On-Off Switching Using a Pair of Picosecond-on/ Nanosecond-Off Gaas Etalons", Applied Physics Letters, AIP, American Institute of Physics, Melville, NY, vol. 57, No. 26, Dec. 24, 1990, pp. 2759-2761, XP000222937.

Dorren et al., "Optical Flip-Flop Based on Two-Coupled Made-Locked Ring Lasers", IEEE Photonics Technology Letters, IEEE Service Center, Piscataway, NJ, US, vol. 17, No. 1, Jan. 1, 2005, pp. 208-210, XP011124100.

Antonio Malacarne et al., "20 ps Transition Time All-Optical SOA-Based Flip-Flop Used for Photonic 10 Gb/s Switching Operation Without any Bit Loss", IEEE Journal of Selected Topics in Quantum Electronics, IEEE Service Center, Piscataway, NJ, US, vol. 14, No. 3, May 1, 2008, pp. 808-815, XP011215953.

G. Berrettini et al., Ultra-Fast Integrable 2×2 All-Optical Switch for Optical Packet Routing, Optical communications, 2006, Sep. 24-28, 2006, pp. 1-2.

G. Berrettini et al., Untrafast Integrable and Reconfigurable XNOR, AND, NOR, and NOT Photonic Logic Gate, IEEE Photonics Technology Letters, vol. 18, No. 8, Apr. 15, 2006, pp. 917-919.

M. Hill et al., All-Optical Flip-Flop Based on Coupled Laser Diodes, IEEE Journal of Quantum Electronics vol. 37, No. 3, Mar. 2001, pp. 405-413.

A. Das Barman et al., Modelling and Implementation of Photonic Digital Subsystem for Bit Comparison, pp. 61-62.

Y. Liu et al., Three-State All-Optical Memory Based on Coupled Ring Lasers, IEEE Photonics Technology Letters, vol. 5, No. 10, Oct. 10, 2003, pp. 1461-1463.

E. Tangdiongga et al., Optical Flip-Flop Based on Two-Coupled Mode-Locked Ring Lasers, IEEE Photonics Technology Letters, vol. 17, No. 1, Jan. 2005, pp. 208-210.

\* cited by examiner

OPTICAL FLIP-FLOP

This application is the U.S. national phase of International Application No. PCT/EP2008/055115, filed 25 Apr. 2008, which designated the U.S. and is hereby incorporated by reference.

TECHNICAL FIELD

The present invention relates to an optical flip-flop. The flip-flop may be used as part of an optical switching system.

BACKGROUND

Optical packet switching seems to be the most promising way to take advantage of fibre bandwidth to increase router forwarding capacity, being able to achieve very high data rate operations. Optical flip-flops have been widely investigated mainly because they can be exploited in optical packet switches, where switching, routing and forwarding are directly carried out in the optical domain. Some known examples concern optical packet switches, where an optical flip-flop stores the switch control information and drives the switching operation. Former solutions for all-optical flip-flops exploit discrete devices or Erbium-doped fibre properties which suffer from slow switching times and high set/reset input powers. Several integrated or integrable solutions present a switching energy in the fJ range and switching times of tens of ps at the expenses of poor contrast ratios. On the other hand there is an integrated scheme exhibiting a very high contrast ratio value but with transition times in the ns range. In any case a trade off between contrast ratio and edges speed must be found as a function of the flip-flop application.

A known micro-resonators-based bi-stable element presents high optical operating power, pJ switching energies and microsecond switching times, theoretically reducible down to the order of tens of ps. Making a comparison with electronics, recent large-scale integration (LSI) circuits show switching energies of 1fJ although with slower switching speeds.

In H. J. S. Dorren, et al., "Optical packet switching and buffering by using all-optical signal processing methods", *J. Lightwave Technol.*, vol. 21, pp. 2-12, 2003, a solution based on coupled ring lasers is proposed. This solution offers a certain number of advantages: it can provide high contrast ratios between states; there is no difference in the mechanisms for switching from state 1 to state 2 and vice-versa, allowing symmetric set and reset operations; it presents a large input light wavelength range and a controllable switching threshold. Moreover, considering an integrated version of this kind of flip-flop, through numerical analysis a switching energy in fJ range has been demonstrated.

An optical flip-flop is a well known bi-stable circuit or circuit element capable of being stable in either one of two states, e.g. signifying a '1' or a '0', a 'high' state or a 'low' state, etc. A flip-flop can therefore represent or store a single bit of information. In an optical flip-flop, all signal processing is carried out in the optical domain—the input to the flip-flop is an optical signal, the output of the flip-flop is an optical signal and any intermediate signal processing by the flip-flop is in the optical domain. Similarly in an optical switch, all signal processing is carried out in the optical domain—the input to the switch is an optical signal, the output of the switch is an optical signal and any intermediate signal processing by the switch is in the optical domain.

Set-reset flip-flops (SR flip-flops) are also known. SR flip-flops usually comprise two inputs and if neither one is high, an output condition of the flip-flop is maintained in its current state (the status quo is maintained). If a first input is made high, while the other input is low, a particular output condition, e.g. output='1' is provided, and if, instead, the second input is made high whilst the first input is kept low then the other output condition, i.e. output='0' is provided. One of these conditions is the 'set' condition (e.g. the one which provides output=1), and the other condition, (i.e. output=0) is the 'reset' condition.

One known type of optical SR flip-flop is a coupled ring laser-based flip-flop. Y. Liu, et al., "Three-State All-Optical Memory Based on Coupled Ring Lasers", *IEEE Photon. Technol. Lett.*, vol. 15, no. 10, pp. 1461-1463, October 2003, discloses such an all-optical flip-flop arrangement.

As discussed, flip-flops are bi-stable elements. Multi-stable elements (for example elements or devices which have three stable states or more stable states are known. Investigation of such devices is found in articles such as:

"Three-state all-optical memory based on coupled ring lasers" Y. Liu; M. T. Hill; N. Calabretta; H. de Waardt; G. D. Khoe; H. J. S. Dorren; Photonics Technology Letters, IEEE Volume 15, Issue 10 Oct. 2003 Page(s):1461-1463; or "Three-State Optical Memory Based on Coupled Ring Lasers" Jing Wang, Yuancheng Zhang, Antonio Malacarne, Antonella Bogoni, Luca Poti and Minyu Yao; OFC/NFOEC 2008, OMV5; or "Multi-state optical memory based on serially interconnected lasers" Zhang, S.; Owens, D.; Liu, Y.; Hill, M. T.; Lenstra, D.; Tzanakaki, A.; Khoe, G. D.; Dorren, H. J. S.; 31st European Conference on Optical Communication, 2005. ECOC 2005. Volume 4, 25-29 Sep. 2005 Page(s):791-792 vol. 4.

It is an aim of this invention to provide an improved flip-flop.

SUMMARY

According to a first aspect of the present invention there is provided an optical flip-flop comprising first and second flip-flop elements arranged to respectively provide first and second optical outputs. Each output is in one of a plurality of states. Switching the output from a relatively high power state to a relatively low power state has an associated falling edge transition time. Switching the output from a relatively low power state to a relatively high power state has an associated rising edge transition time. The rising edge transition time is greater than the falling edge transition time. The optical flip-flop comprises a processor arranged to process the first and second outputs to provide an optical flip-flop output, being one of a plurality of state outputs. Switching the flip-flop output from a relatively high power state to a relatively low power state has an associated falling edge transition time. Switching the flip-flop output from a relatively low power state to a relatively high power state has an associated rising edge transition time. The processor is arranged to process the first and second outputs such that both the falling edge transition time and the rising edge transition time of the flip-flop output are independent of the rising edge transition times of both the first and second flip-flop elements.

Advantageously the transition times of the flip-flop output are not relatively slow and the method of operating the flip-flop is not relatively slow. This is as a result of the transition times not being based upon relatively slow flip-flop element transition times.

The processor may be arranged to derive a rising edge of the flip-flop output from a falling edge of the first output. The processor may be arranged to derive a rising edge of the flip-flop output from a falling edge of the second output. The processor may be arranged to derive a falling edge of the flip-flop output from a falling edge of the first output. The processor may be arranged to derive a falling edge of the flip-flop output from a falling edge of the second output.

The flip-flop may comprise a synchroniser arranged to synchronise the first output with the second output. The synchroniser may be arranged to synchronise the first and second outputs such that rising edges of the first output occur substantially simultaneously with rising edges of the second output. The synchroniser may be arranged to synchronise the first and second outputs such that rising edges of one of the first and second outputs do not coincide with falling edges of the other of the first and second outputs.

The first and second outputs, or signals derived therefrom, may be combined and the synchroniser comprises respective path lengths that signals at the first output and the second output are required to travel before they are combined.

The processor may be arranged to invert the first output to provide a first inverted optical output and then combine the first inverted output with the second output to provide a combined optical output, being the flip-flop output.

The processor may be arranged to invert the combined output to provide the flip-flop output.

The processor may comprise an optical NOT gate arranged to process the first output to provide the first inverted output, an optical AND gate arranged to process the first inverted and second outputs to provide the combined output and a further optical NOT gate arranged to process the combined output to provide the flip-flop output.

The first and second flip-flop elements may be substantially identical.

Each flip-flop element may have at least three output states.

The rising edge transition time and the falling edge transition time of the flip-flop output may be substantially the same, up to about 100 ps.

According to a second aspect of the present invention there is provided a method of operating a flip-flop comprising providing first and second flip-flop elements having respectively first and second optical outputs. Each output is in one of a plurality of states Switching the output from a relatively high power state to a relatively low power state has an associated falling edge transition time. Switching the output from a relatively low power state to a relatively high power state has an associated rising edge transition time. The rising edge transition time is greater than the falling edge transition time. The method comprises processing the first and second outputs to provide a flip-flop optical output, which is one of a plurality of state outputs. Switching the flip-flop output from a relatively high power state to a relatively low power state has an associated falling edge transition time. Switching the flip-flop output from a relatively low power state to a relatively high power state has an associated rising edge transition time. The step of processing comprises processing the first and second outputs such that both the falling edge transition time and the rising edge transition time of the flip-flop output are independent of the rising edge transition time of both the first and second flip-flop elements.

The method may comprise synchronising the first and second outputs such that rising edges of the first output occur substantially simultaneously with rising edges of the second output.

The step of processing may comprise deriving rising edges and falling edges of the flip-flop output from at least one of the falling edges of the first output and the falling edges of the second output.

The flip-flop output may comprise a pulsed output.

According to a third aspect of the present invention there is provided an optical switching method comprising controlling an optical switch using the flip-flop output, from the method of the second aspect of this invention, as a control signal for the switch.

According to a fourth aspect of the invention there is provided an optical switching arrangement comprising an optical switch and the optical flip-flop of the first aspect of this invention. The flip-flop output from the flip-flop is used as a control signal to control operation of the switch.

According to a fifth aspect of the invention there is provided a telecommunications network comprising an optical switch comprising the flip-flop of the first aspect of this invention.

For the avoidance of doubt it is clear that the invention can be applied to multi-stable flip-flops, not just bi-stable flip-flops, but 3-stable, 4-stable, 5-stable etc. flip-flops. It is apparent to the skilled person how the invention can be extended to these types of elements as discussed previously. This is because these flip-flop elements still provide an output with a fast falling edge and slow rising edge.

In some embodiments, the flip-flop outputs can be processed by cascading through optical NOT gates (e.g. SOA-based logic gates analogous to the processing arrangement described in the below-described two-state configuration).

The scope of protection sought is defined in the claims. Where a claim is specified in a particular category (e.g. method, system, etc.), protection for the feature specified in that claim is also sought in other categories (e.g. system, method etc.) even if not specified. For example the features of the optical flip-flop claims may be protected as corresponding method claims, or corresponding optical switching arrangement or system claims.

BRIEF DESCRIPTION OF THE DRAWINGS

The present invention will be understood and appreciated more fully from the following detailed description taken in conjunction with the drawings in which.

Figure 10:
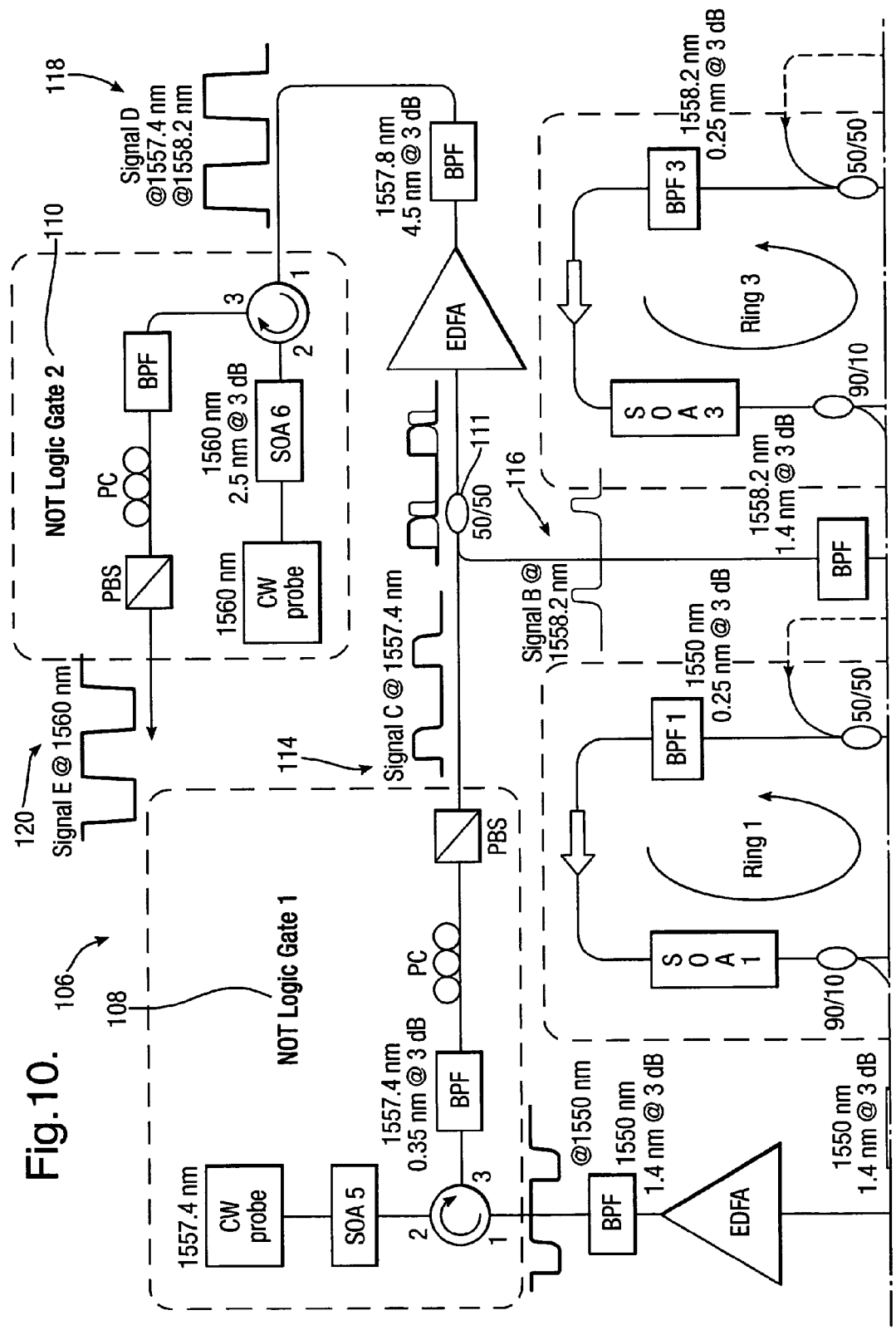
FIG. 10 schematically shows an experimental setup of an optical flip-flop according to another embodiment of this invention—SOA: semiconductor optical amplifier; BPF.
Figure 10:
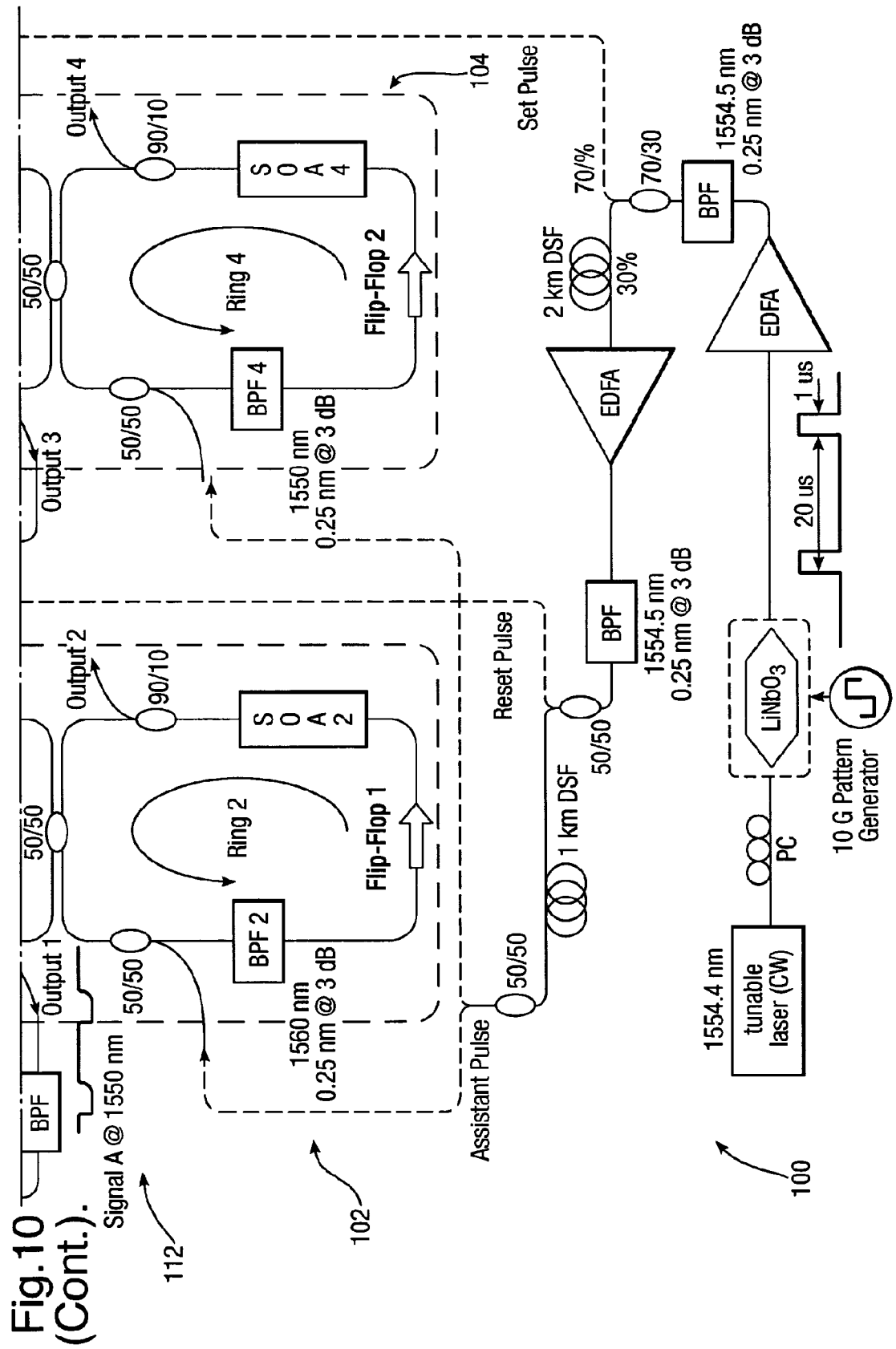
Figure 11:
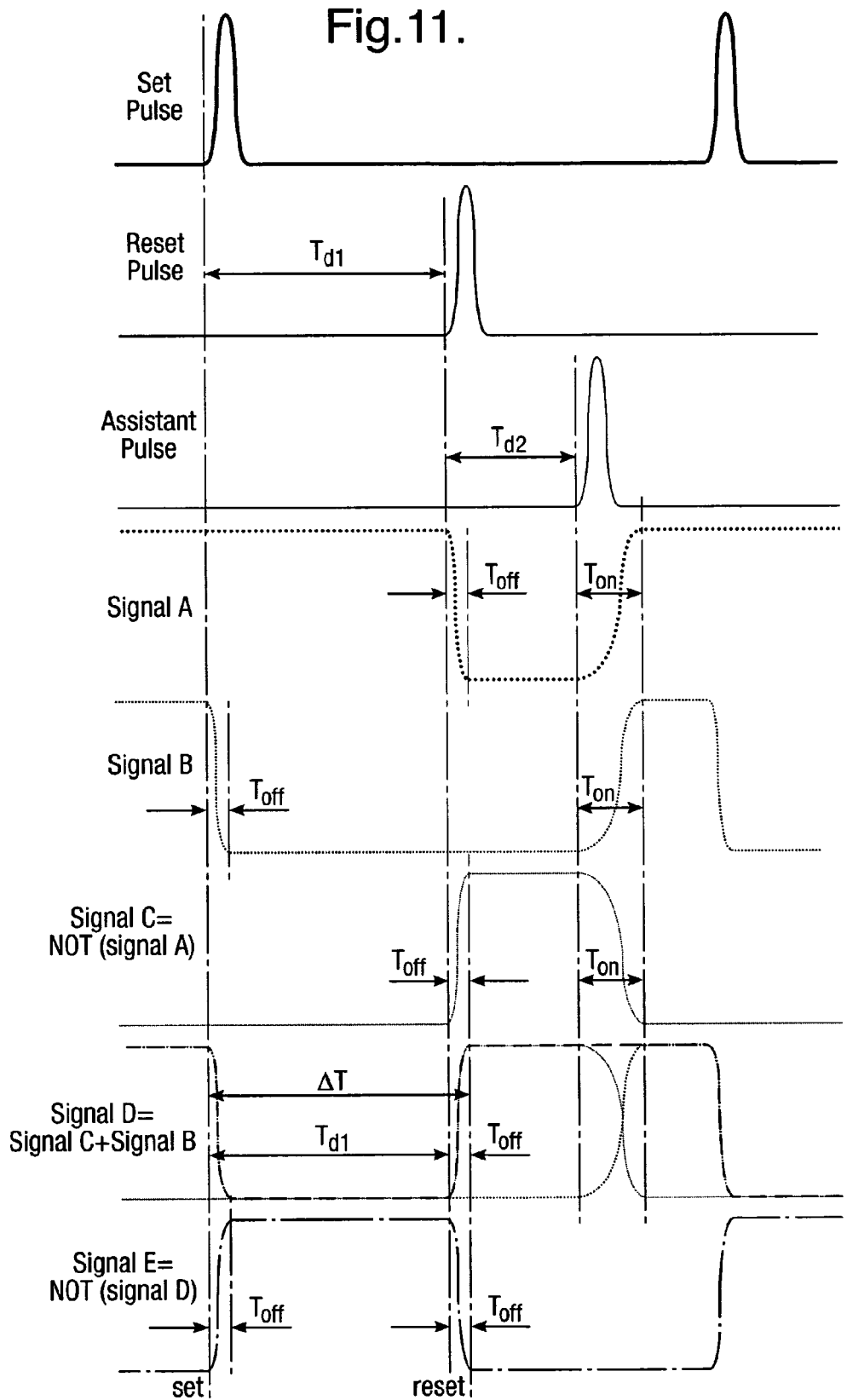
Figure 12:
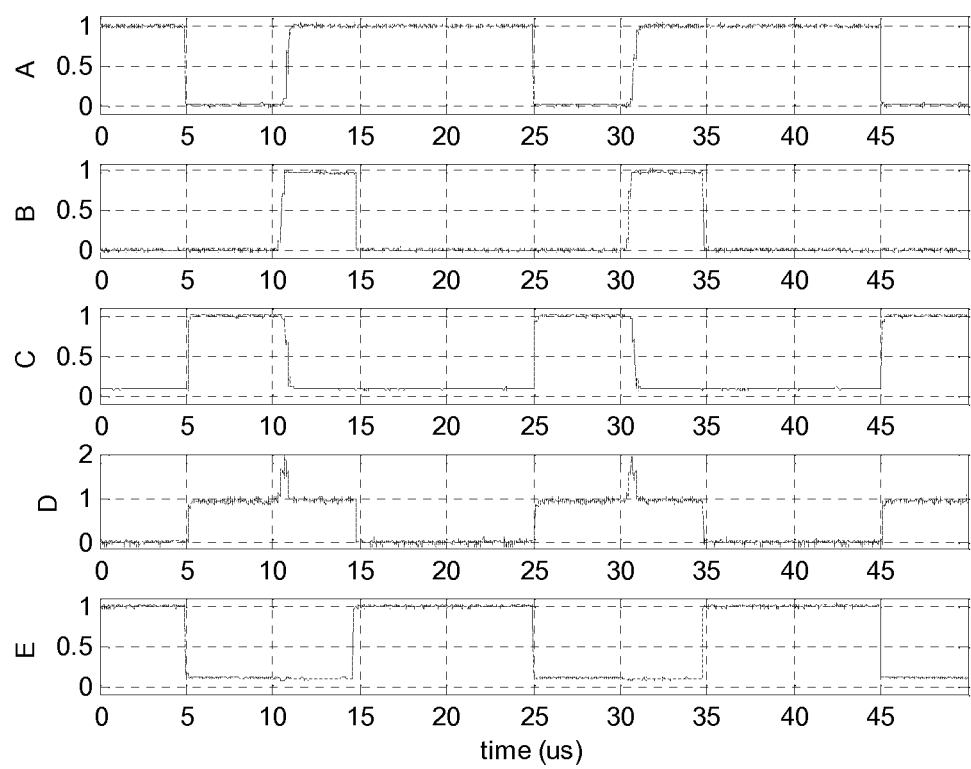
Figure 13:
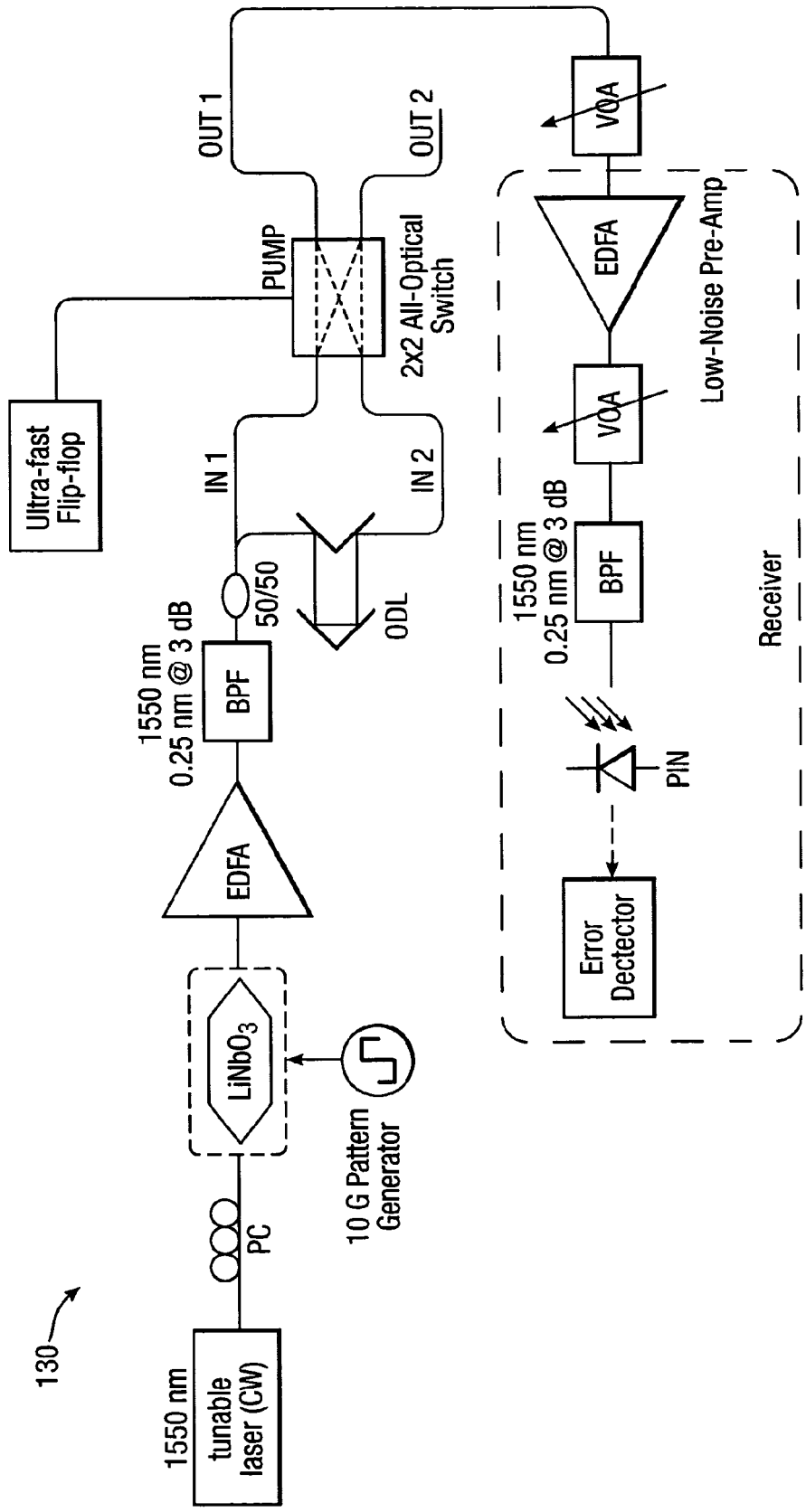

band pass filter; PC: polarization state controller; PBS: polarization beam splitter; DSF: dispersion shifted fiber; EDFA: Erbium doped fiber amplifier;

FIG. 11 shows representations of signals passing through the flip-flop of FIG. 10;

FIG. 12 shows representations of signals passing through the flip-flop of FIG. 11; and FIG. 13 shows an optical switching arrangement according to an embodiment of this invention—PC: polarization controller; BPF: band pass filter; VOA: variable optical attenuator; EDFA: Erbium doped fiber amplifier; ODL: optical delay line.

DETAILED DESCRIPTION

The present inventors have realized the limitations of known optical flip-flops, and further appreciated how such limitations in slow switching speeds can be addressed. Such limitations were also verified by the inventors using known designs of optical flip-flops.

Figure 1:
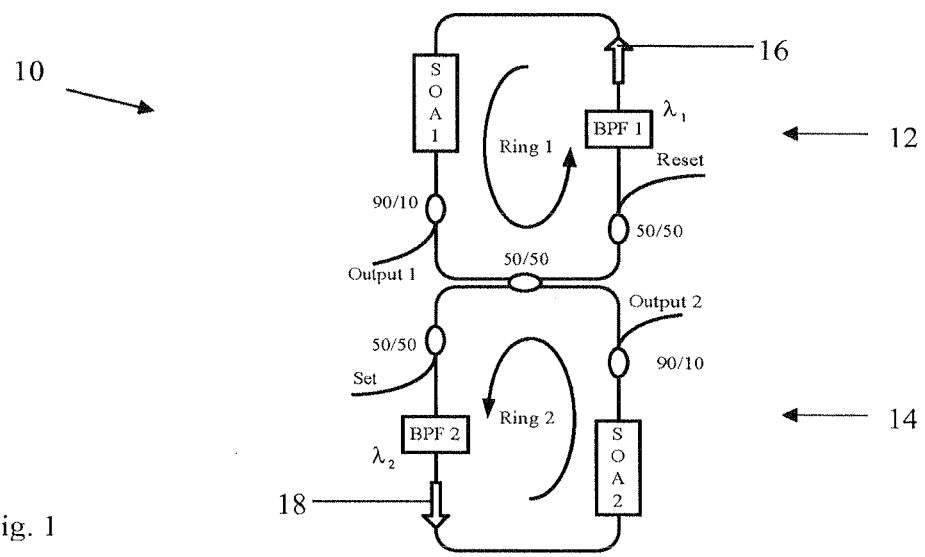
FIG. 1 is a diagram illustrating an example of a known optical flip-flop element.
Figure 2:
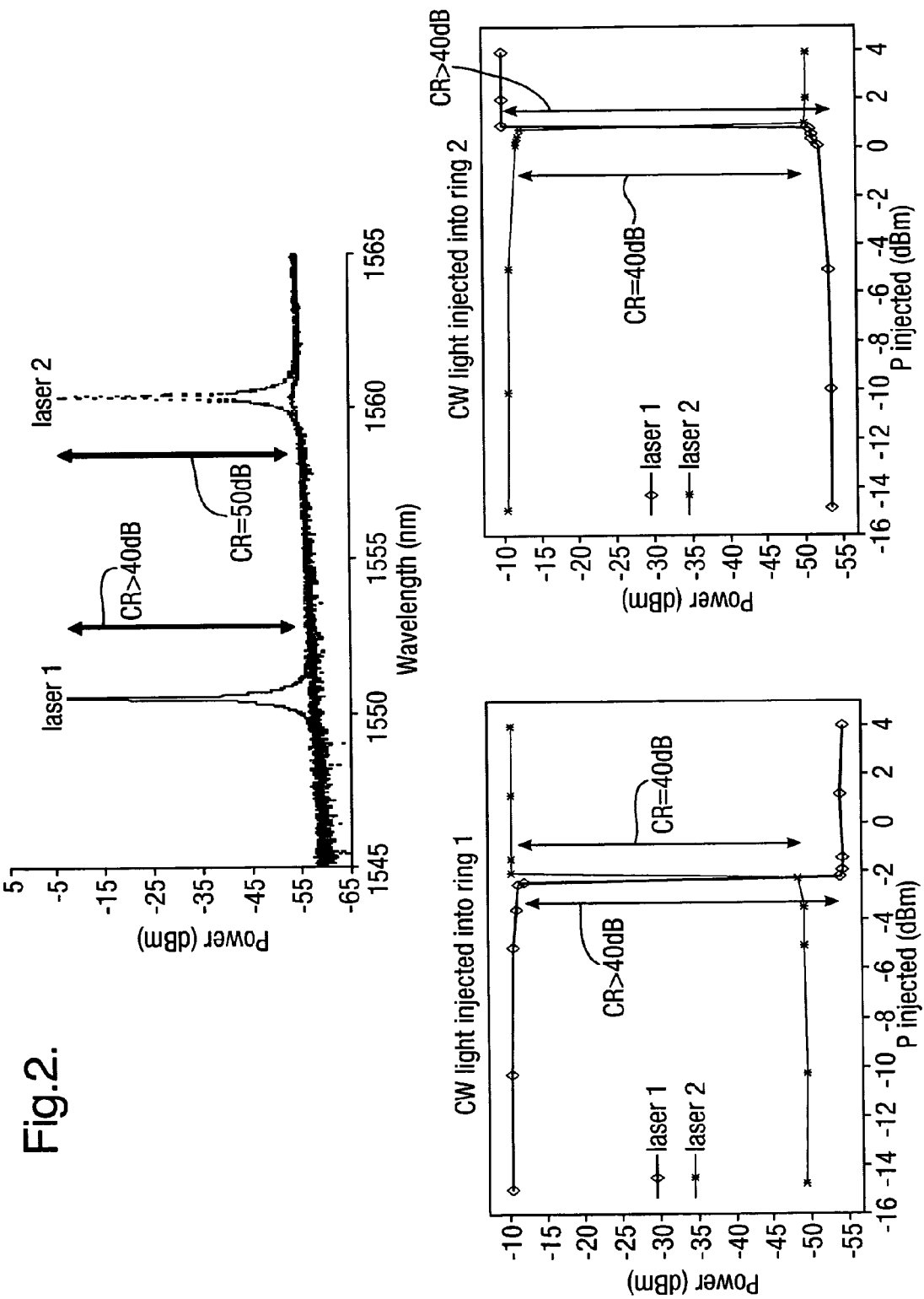
FIG. 2 shows experimental results obtained using the flip-flop element of FIG. 1—optical spectra of the two states (top graph); and output power of both the lasers—v-injected input power into cavity 1 (bottom left graph) and into cavity 2 (bottom right graph)

For, example, referring to FIG. 1, a flip-flop 10 comprises two coupled ring lasers 12, 14 emitting at two different wavelengths ($\lambda_1$=1550 nm and $\lambda_2$=1560 nm). In each ring, an SOA (semiconductor optical amplifier) SOA1, SOA2 acts as the gain element, a 0.25 nm band-pass filter, BPF1, BPF2 is used as the wavelength selective element, and an isolator 16, 18 makes the light propagation unidirectional. Both the SOAs, SOA1, SOA2 are polarization insensitive Multi-Quantum Well (MQW) structures with a small-signal gain of 31 dB, a saturation power of 13 dBm and a peak of Amplified Spontaneous Emission (ASE) noise at 1547 nm. The system can have two states. In "state 1", light from ring 1 suppresses lasing in ring 2, reaching cavity 2 through the 50/50 coupler and saturating the SOA 2 gain. In this state, the optical flip-flop output 1 emits continuous wave (CW) light at wavelength $\lambda_1$. Conversely, in "state 2" light from ring 2 suppresses lasing in ring 1 (saturating SOA 1 gain). In this case the optical flip-flop output 2 emits CW light at wavelength $\lambda_2$. To dynamically change state, lasing in the dominant cavity can be switched off by injecting external pulsed light with a wavelength different from $\lambda_1$ and $\lambda_2$ ($\lambda_{IN}$=1554.5 nm). In FIG. 2 experimental measurements of the two states' optical spectra are investigated and a graph of the output power of both the ring lasers, versus the CW input power injected into each cavity is reported. In all considered experimental cases an output contrast ratio higher than 40 dB is obtained.

Figure 3:
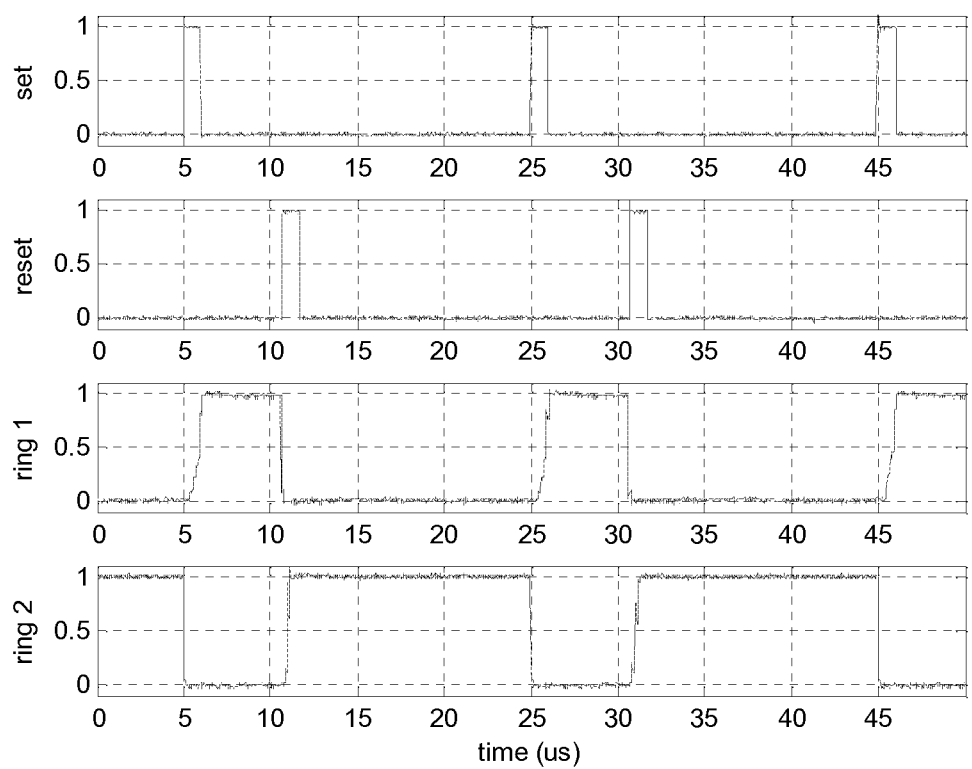
FIG. 3 shows experimental results obtained using the flip-flop element of FIG. 1 and an input pulse repetition rate of 50 kHz.

By injecting two regular sequences of pulses into the set and reset ports a dynamic flip-flop operation is demonstrated as shown in FIG. 3.

Figure 4:
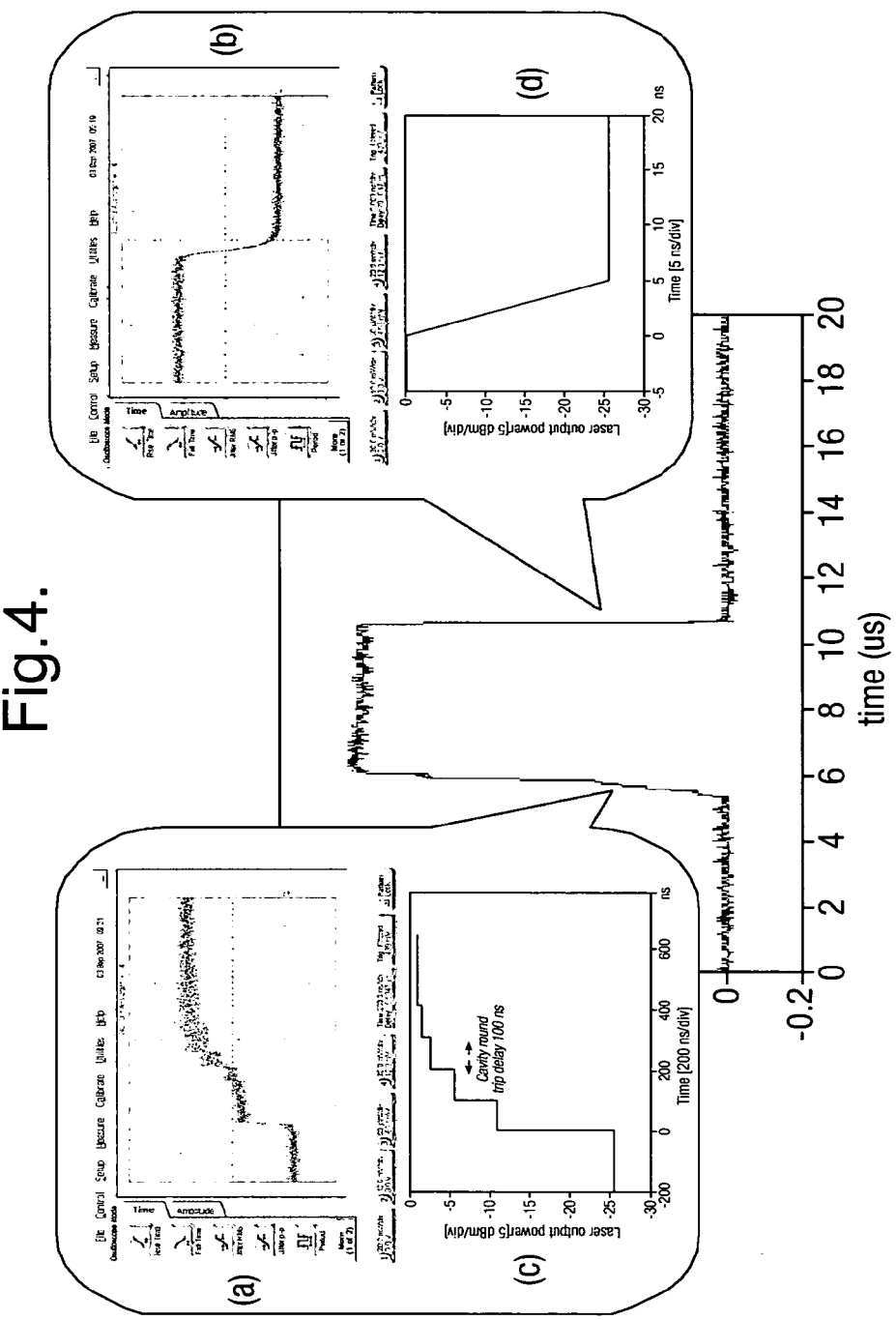
FIG. 4 shows measured, (a) and (b), and simulated, (c) and (d) rising and falling edge behaviour for the flip-flop element of FIG. 1.

When the flip-flop switches from one state to the other, the transition speed is determined by the switching-off and switching-on time of the two states. It has been experimentally observed that falling time only depends on the edge time of pulses (5 ns in this section), while rising time is determined by the cavity length and the length of the fiber between the two SOAs. In this exemplary setup, each ring has a cavity length of 20 m corresponding to a round-trip time of about 100 ns. Experimental measurements show (FIG. 4(a)) that the building-up process of one state takes place step by step and each step corresponds to a cavity round-trip time equal to 100 ns. The total rising edge behavior lasts several hundreds of ns. The experimental falling edge behavior is shown in FIG. 4(b), with a transition time of 5 ns, equal to the input pulse edge.

Dynamics behaviour of the two SOA-based coupled lasing cavities has been analyzed by the present inventors through simulations as well. Steady states behaviour of two coupled lasing cavities using two coupled set of rate equations for electron and photon density have been analyzed in M. T. Hill, et al., "All optical flip-flop based on coupled laser diodes", *IEEE J. Quantum Electron.*, vol. 37, no. 3, pp. 405-413, March 2001.

For their simulations, the inventors assumed identical SOAs in both the cavities and symmetric coupled rings, 1500 μm-long commercial SOAs segmented into ten sections [as disclosed in A. Das Barman, et al., "Modelling and implementation of photonic digital subsystem for bit comparison", *Photonics in Switching*, TuB2.4, 2007 and W. Mathlouthi, et al., "Fast and efficient dynamic WDM semiconductor optical amplifier model," *J. Lightwave Technol.*, vol. 24, pp. 4353-4365, 2006] (ten sections provides optimum performance in terms of speed and accuracy) and each SOA section acting as a punctiform amplifier in the cavity. Assuming the same parameters of the experimental setup (cavity length and cavity loss, injected pulses edge time and average power), as can be observed in FIG. 4(c)-(d), simulation results for rising and falling edges are in agreement with experimental measurements, confirming the step behaviour of the rising edge and at the same time a falling edge as fast as the input pulse edge.

Figure 5A:
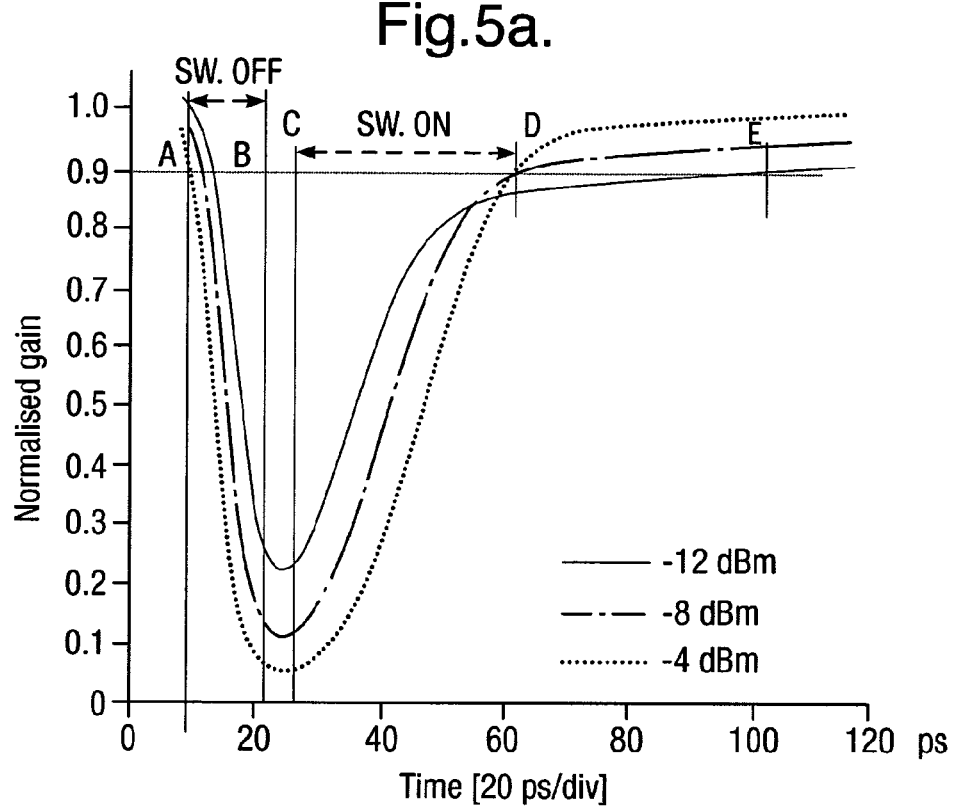
FIG. 5 shows data from a study of recovery time of a SOA in a 2000 µm-long cavity for different input powers (top) and rising and falling edge behaviour for an integrated SOA-based flip-flop (bottom).
Figure 5B:
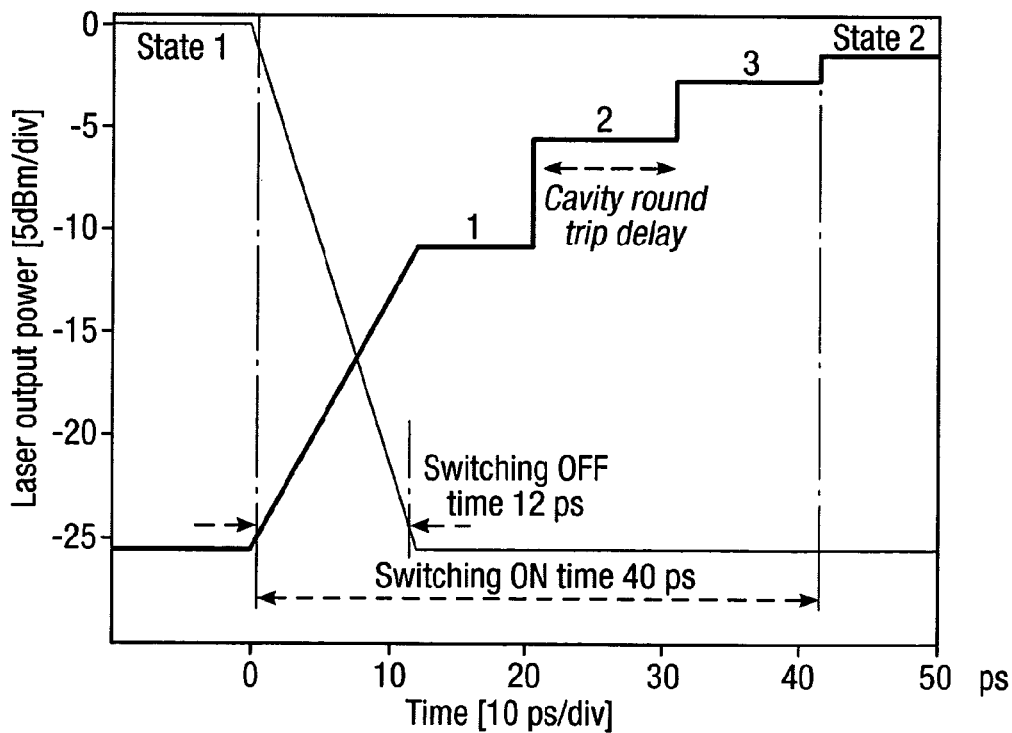

In order to simulate an integrated version of the flip-flop, a 12 ps-edge pulse with different average powers is supposed to be injected as set and reset signals and SOA gain recovery time is studied. 2 mm cavity length and 0.5 mm SOA length are assumed. A 12 ps falling time (FIG. 5(a), from A to B) and ~40 ps rising time (FIG. 5(a), from C to D) for the gain recovery can be observed for an input pulse power of −8 dBm. Increasing the injected input pulse power up to −4 dBm, no gain recovery time reduction has been obtained, whereas decreasing the input power to −12 dBm, gain recovery time slows down to 72 ps (FIG. 5(a), from C to E) because of a partial depleting of SOA carrier density. They deduced a critical injected pulse power below which rising time increases, and a rising time lowest value of about 40 ps as well. Furthermore, in both discrete device-based and integrated implementations the injected input pulses have to maintain the SOA saturation condition of a cavity until the other cavity reaches a steady lasing condition. Therefore the shortest injected pulse-width is ~40 ps. FIG. 5(b) reports the fastest achievable rising and falling edges for the integrated solution of the flip-flop exploiting SOA-based coupled ring cavities.

The inventors realised that prior art flip-flop designs can be improved.

Figure 6:
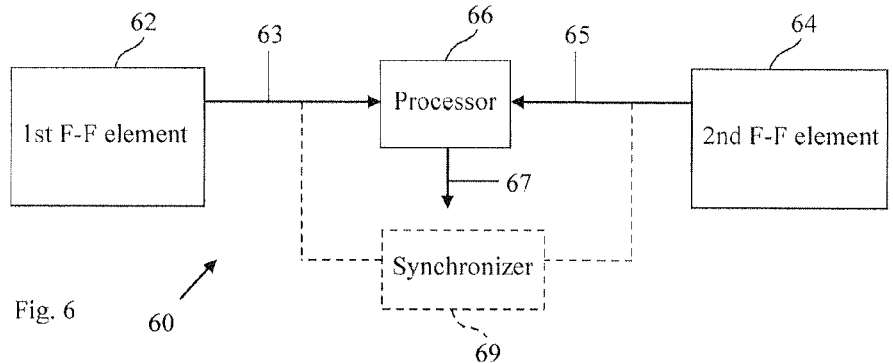
FIG. 6 schematically shows an optical flip-flop according to an embodiment of this invention (in solid lines), and according to another embodiment (in solid+dashed lines)

Referring to FIG. 6, according to one embodiment of this invention an optical flip-flop 60 comprises a first flip-flop element 62 and a second flip-flop element 64. Each flip-flop element has an optical output—the first flip-flop element 62 has a first optical output 63 and the second flip-flop element 64 has a second optical output 65. Each output 63, 65 can be in one of a plurality of states. The states can be distinguished by the power of the output, and as described previously, when a flip-flop element moves from a relatively high power state to a relatively low power state there is an associated falling edge transition time, which is the time taken in changing the output from the high power state to the low power state. Similarly, switching the output from a relatively low power state to a relatively high power state has an associated rising edge transition time. As previously discussed, the rising edge transition time is greater than the falling edge transition time. For example, in optical cavity based flip-flop elements, the rising edge transition time is longer than the falling edge transition time since the relatively high power output is achieved after light travels through the optical cavity a number of times resulting in the output being amplified to a level at which the required output state is reached.

The flip-flop 60 also comprises a processor 66 arranged to process the first 63 and second 65 outputs in order to provide a flip-flop output 67. The flip-flop output 67 can be one of a number of different state outputs (for example, in a 2-state flip-flop, a '1' or a '0'). Once again, switching the flip-flop output 67 from a relatively high power state to a relatively low power state has an associated falling edge transition time and switching the flip-flop output 67 from a relatively low power state to a relatively high power state has an associated rising edge transition time. The processor 66 is arranged to process the first 63 and second 65 output such that both the falling edge transition time and the rising edge transition time of the flip-flop output 67 are independent of the rising edge transition times of the first flip-flop element 62 and of the second flip-flop element 64. Advantageously, none of the switching times of the flip-flop output 67 depend upon a rising edge transition time of either flip-flop element 62, 64, and so the transition times of the flip-flop output 67 are relatively fast compared to existing flip-flop transition times. The flip-flop output 67 transition times are not limited by light having to travel a number of cycles through a flip-flop element cavity before a final output state is reached. A flip-flop output 67 with relatively fast rising edge transition time and relatively fast falling edge transition time is therefore provided by this invention. The elements shown in dashed lines in FIG. 6 do not form part of this embodiment.

Figure 7:
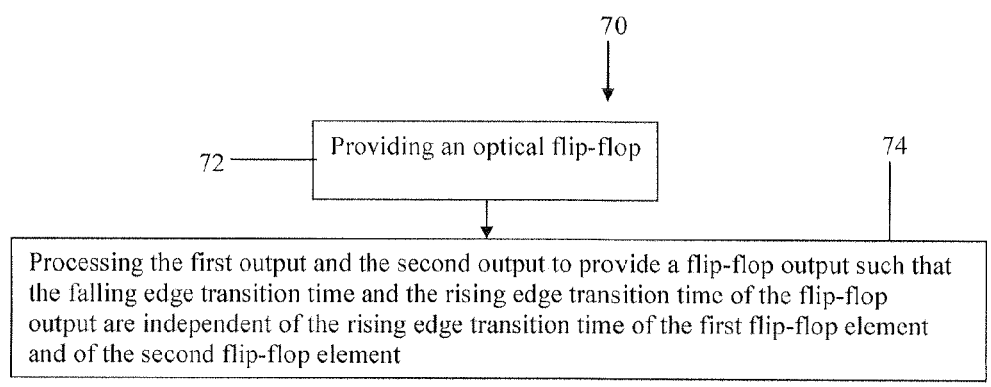
FIG. 7 shows steps in a method of operating a flip-flop according to an embodiment of this invention.

Referring to FIG. 7, a method 70 of operating a flip-flop comprises an initial step of providing 72 an optical flip-flop (as described in the above mentioned first described embodiment). The method 70 further comprises the step 74 of processing the first output 63 and the second output 65 to provide the optical flip-flop output 67, wherein the processing 74 is such that the falling edge transition time and the rising edge transition time of the flip-flop output 67 are independent of the rising edge transition time of both the first 62 and the second 64 flip-flop elements.

Figure 8:
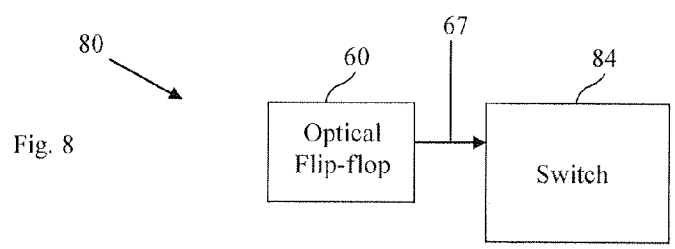
FIG. 8 schematically shows an optical switching arrangement according to an embodiment of this invention.
Figure 9:
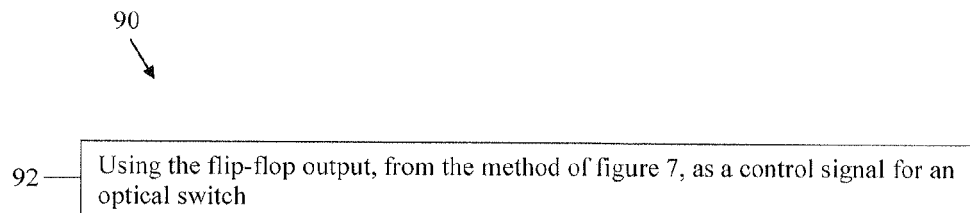
FIG. 9 shows steps in an optical switching method according to an embodiment of this invention.

Referring to FIGS. 8 and 9, an optical switching arrangement 80 comprises an optical switch 84 and the optical flip-flop 60 described above. The flip-flop output 67 is used as a control signal 67 to control operation of the switch 84.

An optical switching method 90 comprises controlling the optical switch 84 using the flip-flop output 67 as a control signal for the optical switch 84.

In a further embodiment, referring to FIG. 6, there is provided a synchroniser 69. The synchroniser 69 (shown in dashed lines in FIG. 6) is arranged to synchronise the first 63 and second 65 outputs such that rising edges of the first output 63 occur substantially simultaneously with rising edges of the second output 65. Advantageously, in this embodiment the flip-flop output 67 can be provided as a periodic output and the period for one cycle of the output will be limited by the relatively slow rising edge transition times of the first 62 and second 64 flip-flop elements. By synchronising the first 63 and second 65 outputs such that the rising edges in these outputs occur at the same time, the periodic cycle time of the flip-flop output 67 can be minimised if required or desired. If there is no need to have a relatively short cycle time, then the synchronisation can still be a benefit to provide a tidy signal processing mechanism, but is less important in terms of its impacts upon the minimum possible cycle time of the flip-flop output 67.

In some embodiments the synchroniser 69 is arranged to synchronise the first and second outputs 63, 65 such that the rising edges of one of the outputs does not coincide with falling edges of the other of the outputs.

In some embodiments the flip-flop 60 is provided as a hardware unit and the synchroniser 69 is provided by setting the path lengths that the different optical outputs 63, 65 need to travel before they interact due to the processor 66 carrying out its processing. By controlling the path lengths that each output has to travel from its origin to the location that they are combined, it is possible to carry out the above mentioned synchronising steps.

In some embodiments, the processor 66 is arranged to invert the first output 63 to provide a first inverted optical output and then to combine the first inverted optical output with the second output in order to provide a combined optical output. This combined optical output comprises the flip-flop output 67 in such embodiments.

In other embodiments, the processor 66 is further arranged to invert the combined output (described above) in order to provide the flip-flop output 67.

In some embodiments the first and second flip-flop element 62, 64 are identical.

In some embodiments the falling edge transition time of the flip-flop output is substantially the same as the rising edge transition time of the flip-flop output—in some embodiments this is about 20 ps. In other embodiments the edge transition time, or switching time, might be between 20 ps and 100 ps (for a 16 ps pulse edge (or similar) as in this embodiment. The upper limit for the transition time is set by the input pulse edge duration. For example, if the input pulse edge duration is 110 ps, the switching time is also 110 ps.

In a further embodiment, referring to FIG. 10, an optical flip-flop 100 comprises two substantially identical flip-flop elements—a first flip-flop element 102 and a second flip-flop element 104. Both flip-flop elements 102, 104 comprise coupled ring lasers. The flip-flop 100 comprises these two flip-flop elements 102, 104 and a processor 106 in the form of two SOA based optical NOT gates 108, 110 and a 50-50 coupler 111, all as described in detail below.

Referring to FIGS. 10 and 11, the first flip-flop element 102 is controlled by reset and assistant pulses whereas the second flip-flop element flip-flop 2 is controlled by assistant and set pulses. Exploiting a 10 GHz pattern generator a 16 ps-edge pulsed sequence with a pulse-width of 1 μs and a repetition rate of 50 KHz is provided in this embodiment. Such a wide pulse is set in this embodiment in order to maintain the gain saturation level into the ring laser to be quenched for several round trip times, allowing a lasing steady condition to be reached. The reset pulse is delayed by 10 μs ($T_{d1}$) with respect to the set pulse whereas the assistant pulse is delayed by 15 μs ($T_{d1}+T_{d2}$) with respect to the set pulse. As shown in FIG. 11, a set pulse is firstly injected into ring 3 switching off signal B. Secondly, a reset pulse is injected into ring 1 switching off signal A. Then two assistant pulses are injected into ring 2 and ring 4 simultaneously, thus switching off ring 2 and ring 4, and switching on ring 1 and ring 3 respectively. Consequently, signals A and B are switched on at the same time.

As discussed above, both signals A and B have a fast falling edge, but a relatively slow rising edge. Exploiting the first optical NOT logic gate 1, 108, signal A, 112, is inverted in order to obtain signal C, 114, which therefore presents a fast rising edge and a slow falling edge. Since signals A, 112, and B, 116, are switched on by two assistant pulses simultaneously, the slow falling edge of signal C is almost synchronized with the slow rising edge of signal B, and when they are added together, the slow edges compensate each other in terms of intensity profile. This way, signal D, 118 (the sum of signals B and C) has a fast rising edge due to signal C and a fast falling edge coming from signal B, and the slow edges effectively cancel each other out. The wavelengths of signals A, B and C are 1550 nm, 1558.2 nm and 1557.4 nm respectively, thus signal D is made by two different wavelengths. A tuneable filter with −3 dB bandwidth of 4.5 nm is used to filter and equalize these two wavelength components. Using second NOT logic gate 2, 110, signal D is inverted to obtain signal E, and at the same time the signal is converted to one single wavelength $\lambda_E$=1560 nm. Signal E, 120, is switched on and off by the set and reset pulses respectively, showing fast rising and falling edges.

The optical NOT logic gates are implemented exploiting cross gain modulation (XGM) in SOAs. Referring to NOT logic gate 1, in SOA 5 a continuous wave (CW) probe light counter-propagates with respect to signal A. The gain of SOA 5 is modulated by the intensity profile of signal A through XGM. In particular, when signal A has a low input power, the gain provided by SOA 5 for the CW probe will be high, whereas when signal A has a high power the CW probe will experience a lower gain. Ultimately the CW probe undergoes the gain variations obtaining the inversion of signal A, i.e. signal C. At the gate output (port 3 of circulator), selecting the right polarization state through a polarisation state controller (PC) and a polarisation beam splitter (PBS) it is possible to increase the extinction ratio through XPM-based polarization rotation and to limit noise induced by reflections on the fibre-SOA interface. The principle of this all-optical NOT logic gate is known, e.g. from "Ultrafast Integrable and Reconfigurable XNOR, AND, NOR, and NOT Photonic Logic Gate", *IEEE Photon. Technol. Lett.*, vol. 18, no. 8, pp. 917-919, April 2006, authored by Berrettini G., et al.

Signals from A to E are shown in FIG. 12. Since the slow edges of signals B and C do not have a linear behaviour, their sum gives rise to a residual peak during the high level of signal D. After NOT logic gate 2 this dynamic (the residual peak) is suppressed because of the gain saturation level of SOA 6. CW probe power injected into SOA 6 is set in order to optimize its saturation level (as CW probe injected into SOA 5). Exploiting input set and reset pulse-widths of 1 μs with edge time of 16 ps, signal E presents rising and falling times of 18.8 ps and 21.9 ps respectively (measured with a total bandwidth of 53 GHz), preserving a contrast ratio of 17.5 dB. In other embodiments, it is possible to obtain a higher contrast ratio by decreasing the CW probe signal powers in SOA 5 and SOA 6, reducing their gain saturation level, at the expense of slower switching times. Moreover, integrated coupled ring lasers would experience a round trip time in the ps range (instead of 100 ns as in this embodiment), allowing use of an injected pulse-width in the ps range too.

The beneficial effect of NOT logic gate 2 in this embodiment is to flatten the high level portion of signal E—the undesired/unrequired residual peak is removed by NOT logic gate 2 as described above. This inversion step is not an essential feature of the invention and therefore in other embodiments the NOT logic gate 2 (or its equivalent element) may not be present. In other embodiments different signal processing may be provided to smooth the flip-flop output—other signal processing logic will be apparent to the skilled person for achieving the same end. In yet further embodiments, the residual peak remains in the flip-flop output.

In some embodiments a pulsed signal, pulsed from a high energy state to a low energy state is obtained as the flip-flop output. In other embodiments a more gradual varying signal may be obtained.

Referring to FIG. 13, in a further embodiment, the invention provides a switching arrangement 130. The switching arrangement 130 comprises a 2×2 SOA based optical switch as described by Berrettini G., et al. in "Ultra-Fast Integrable 2×2 All-Optical Switch", *ECOC* 2006, France, Cannes, Sep. 24-28, 2006.

A 10 Gb/s optical switching operation using the aforementioned 2×2 optical switch driven by the ultra-fast optical flip-flop is provided. The experimental setup for this embodiment is shown in FIG. 13.

The switching operation is based on XGM effect in two different SOAs. Depending on the high or low intensity level of the control signal (pump), in an SOA the gain is strongly reduced while the other SOA is not saturated.

Referring to FIG. 13, the two input signals are generated by splitting a single 10 Gb/s Non-Return-to-Zero (NRZ) continuous data stream. The stream is generated by modulating a Continuous Wave (CW) laser at $\lambda_{IN}$=1550 nm by means of a Mach Zehnder (MZ) modulator driven by a 10 Gb/s pattern generator running in $(2^{31}-1)$-long Pseudo Random Bit Sequences (PRBS) mode. At the same time the flip-flop output of this invention is used a pump signal of the optical switch and controls the switch state (BAR or CROSS). The inverted pump signal is obtained within the 2×2 optical switch block (shown in FIG. 13) through signal inversion by means of XGM in an SOA. The data streams average power at the switch inputs are set to −7 dBm, while the high pump level is 11.5 dBm.

In this experimental embodiment, continuous data streams are chosen instead of packet traffic to demonstrate that it is possible to obtain a switching operation without any bit loss, exploiting the 20 ps-fast dynamics of the flip-flop of this invention.

The invention claimed is:

1. An optical flip-flop comprising first and second flip-flop elements configured to respectively provide first and second optical outputs, each output being in one of a plurality of states, wherein switching each of the first and second outputs from a relatively high power state to a relatively low power state has an associated falling edge transition time, and switching each of the first and second outputs from a relatively low power state to a relatively high power state has an associated rising edge transition time, wherein the rising edge transition time is greater than the falling edge transition time, the optical flip-flop comprising a processor configured to process the first and second outputs to provide an optical flip-flop output, being one of a plurality of state outputs, wherein switching the optical flip-flop output from a relatively high power state to a relatively low power state has an associated falling edge transition time, and switching the optical flip-flop output from a relatively low power state to a relatively high power state has an associated rising edge transition time, wherein the processor is configured to process the first and second outputs such that both the falling edge transition time and the rising edge transition time of the optical flip-flop output are independent of the rising edge transition times of both the first and second flip-flop elements.

2. The flip-flop of claim 1, wherein the processor is configured to derive a rising edge of the optical flip-flop output from a falling edge of the first output.

3. The flip-flop of claim 1, wherein the processor is configured to derive a rising edge of the optical flip-flop output from a falling edge of the second output.

4. The flip-flop of claim 1, wherein the processor is configured to derive a falling edge of the optical flip-flop output from a falling edge of the first output.

5. The flip-flop of claim 1, wherein the processor is configured to derive a falling edge of the optical flip-flop output from a falling edge of the second output.

6. The flip-flop of claim 1, further comprising a synchroniser configured to synchronise the first output with the second output.

7. The flip-flop of claim 6, wherein the synchroniser is configured to synchronise the first and second outputs such that rising edges of the first output occur substantially simultaneously with rising edges of the second output.

8. The flip-flop of claim 6, wherein the synchroniser is configured to synchronise the first and second outputs such that rising edges of one of the first and second outputs do not coincide with falling edges of the other of the first and second outputs.

9. The flip-flop of claim 6, wherein the first and second outputs, or signals derived therefrom, are combined and the synchroniser comprises respective path lengths that signals at the first output and the second output are required to travel before they are combined.

10. The flip-flop of claim 1, wherein the processor is configured to invert the first output to provide a first inverted optical output and then combine the first inverted output with the second output to provide a combined optical output, being the optical flip-flop output.

11. The flip-flop of claim 10, wherein the processor is configured to invert the combined output to provide the optical flip-flop output.

12. The flip-flop of claim 11, wherein the processor comprises an optical NOT gate configured to process the first output to provide the first inverted output, an optical AND gate configured to process the first inverted and second outputs to provide the combined output and a further optical NOT gate configured to process the combined optical output to provide the optical flip-flop output.

13. The flip-flop of claim 1, wherein the first and second flip-flop elements are substantially identical.

14. The flip-flop of claim 1, wherein each flip-flop element has at least three output states.

15. The flip-flop of claim 1, wherein the rising edge transition time and the falling edge transition time of the optical flip-flop output are substantially the same up to about 100 ps.

16. A method of operating a flip-flop comprising providing first and second flip-flop elements having respectively first and second optical outputs, each of the first and second outputs being in one of a plurality of states, wherein switching each of the first and second outputs from a relatively high power state to a relatively low power state has an associated falling edge transition time, and switching each of the first and second outputs from a relatively low power state to a relatively high power state has an associated rising edge transition time, wherein the rising edge transition time is greater than the falling edge transition time, the method comprising processing the first and second outputs to provide an optical flip-flop output, which is one of a plurality of state outputs, wherein switching the optical flip-flop output from a relatively high power state to a relatively low power state has an associated falling edge transition time, and switching the optical flip-flop output from a relatively low power state to a relatively high power state has an associated rising edge transition time, wherein the step of processing comprises processing the first and second outputs such that both the falling edge transition time and the rising edge transition time of the optical flip-flop output are independent of the rising edge transition time of both the first and second flip-flop elements.

17. The method of claim 16, further comprising synchronising the first and second outputs such that rising edges of the first output occur substantially simultaneously with rising edges of the second output.

18. The method of claim 16, wherein the step of processing comprises deriving rising edges and falling edges of the optical flip-flop output from at least one of the falling edges of the first output and the falling edges of the second output.

19. The method of claim 16, wherein the optical flip-flop output comprises a pulsed output.

20. An optical switching arrangement comprising an optical switch and an optical flip-flop comprising first and second flip-flop elements configured to respectively provide first and second optical outputs, each of the first and second outputs being in one of a plurality of states, wherein switching each of the first and second outputs from a relatively high power state to a relatively low power state has an associated falling edge transition time, and switching each of the first and second outputs from a relatively low power state to a relatively high power state has an associated rising edge transition time, wherein the rising edge transition time is greater than the falling edge transition time, the optical flip-flop comprising a processor configured to process the first and second outputs to provide an optical flip-flop output, being one of a plurality of state outputs, wherein switching the optical flip-flop output from a relatively high power state to a relatively low power state has an associated falling edge transition time, and switching the optical flip-flop output from a relatively low power state to a relatively high power state has an associated rising edge transition time, wherein the processor is configured to process the first and second outputs such that both the falling edge transition time and the rising edge transition time of the flip-flop output are independent of the rising edge transition times of both the first and second flip-flop elements, and wherein the optical flip-flop output from the optical flip-flop is used as a control signal to control operation of the switch.

* * * * *

UNITED STATES PATENT AND TRADEMARK OFFICE
CERTIFICATE OF CORRECTION

PATENT NO.        : 8,542,422 B2                      Page 1 of 1
APPLICATION NO.   : 12/989598
DATED             : September 24, 2013
INVENTOR(S)       : Berrettini et al.

It is certified that error appears in the above-identified patent and that said Letters Patent is hereby corrected as shown below:

On the title page, in item (56), under "OTHER PUBLICATIONS", in Column 2, Line 4, delete "Untrafast" and insert -- Ultrafast --, therefor.

In the Drawings

In Fig. 13, Sheet 11 of 11, delete " 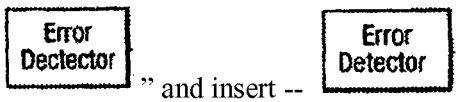 " and insert -- -- , therefor.

In the Specification

In Column 2, Line 16, delete "(for" and insert -- for --, therefor.

In Column 2, Line 30, delete "2005. ECOC 2005." and
insert -- 2005, ECOC 2005, --, therefor.

In Column 3, Line 39, delete "states Switching" and insert -- states. Switching --, therefor.

In Column 4, Line 55, delete "(bottom)." and insert -- (bottom); --, therefor.

In Column 8, Line 23, delete "(for" and insert -- for --, therefor.

Signed and Sealed this
Twenty-second Day of July, 2014

Michelle K. Lee
*Deputy Director of the United States Patent and Trademark Office*